March 17, 1953
F. W. BAUKUS
2,631,368
COMBINED SAW AND HOUSING FOR
A PLURALITY OF CUTTING TOOLS
Filed Oct. 27, 1948
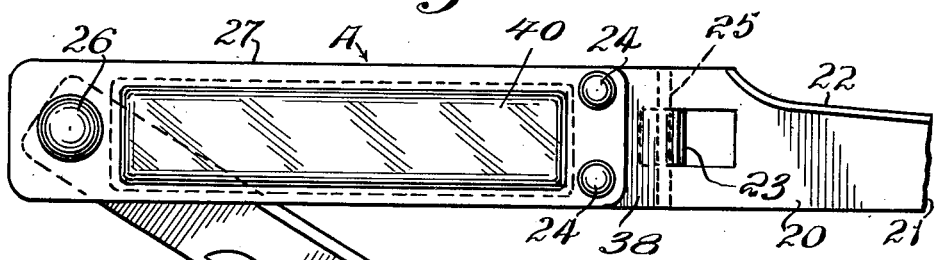
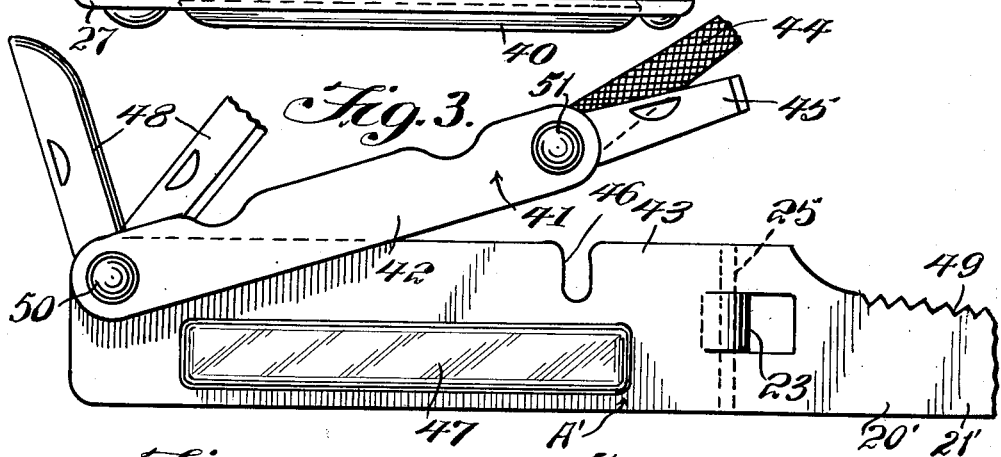
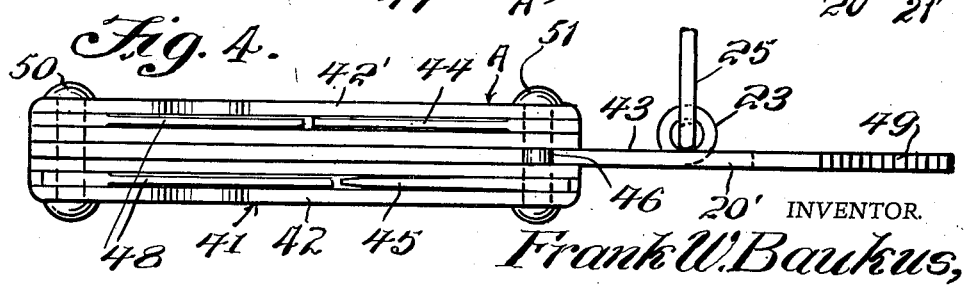
INVENTOR.
Frank W. Baukus,
BY Victor J. Evans & Co.
ATTORNEYS Patented Mar. 17, 1953

2,631,368

UNITED STATES PATENT OFFICE 2,631,368

COMBINED SAW AND HOUSING FOR A PLURALITY OF CUTTING TOOLS

Frank W. Baukus, Saginaw, Mich.

Application October 27, 1948, Serial No. 56,897

2 Claims. (Cl. 30—144)

1

The invention relates to a home or office gadget, and more especially an office device or implement for many uses, for example, a binder holder, letter opener, paper weight, magnifying glass, line follower, rule, paper cutter, sheet holder, etc., and is a divisional application of my pending application for Office Implement filed June 29, 1945, Serial No. 602,300, now Patent Number 2,478,175.

The primary object of the invention is the provision of a device or implement of this character, wherein on associating it with a temporary book-binder, the latter will be prevented from closing, and the pages selected for reading, or otherwise, will be held open, and the line of typed or written matter appearing can be accurately followed, and such matter can be magnified by a magnifying glass forming a part of the device or implement, the said device or implement being convertible to a letter opener, paper weight, rule, paper cutter or other handy medium for services in an office, through selectivity and adjustment therefor.

Another object of the invention is the provision of a device or implement of this character, wherein the construction thereof is novel and unique in the arrangement, so that it will be ready for use, and is entirely devoid of complicated parts, thus enabling the handling thereof with dispatch.

A further object of the invention is the provision of a device or implement of this character, wherein the construction thereof is novel and unique in the arrangement, so that it will be ready for use, and is entirely devoid of complicated parts, thus enabling the handling with dispatch.

A further object of the invention is the provision of a device or implement of this character, which is simple in construction, thoroughly reliable and efficient for universal services, strong, durable, neat in appearance, readily and easily adjusted, conveniently handled, satisfying a wide range of requirements thereof, and inexpensive to manufacture.

With these and other objects in view, the invention consists in the features of construction, combination and arrangement of parts as will be hereinafter set forth in detail, illustrated in the accompanying drawings, which disclose the preferred and modified forms of construction thereof, and pointed out in the claims hereunto appended.

In the accompanying drawings:

Figure 1 is a plan view of the device or implement constructed in accordance with the invention;

Figure 2 is a longitudinal edge view thereof;

Figure 3 is a plan view of a modified form of the invention; and

Figure 4 is a longitudinal edge view thereof.

Similar reference character indicates corresponding parts throughout several views in the drawing.

Referring more in detail to the drawing, the device or implement A constituting the present invention comprises a flat elongated body member 20, which may be made of any suitable material, such as plastic material, hard rubber, metal, wood, or a combination of materials, having a required length, width and thickness. One end portion 21 of such member is outwardly tapered, and one side edge throughout the entire length of the said portion is beveled to provide a cutting edge 22, so that this portion 21 can be utilized as a letter-opener, paper cutter, or otherwise.

Swingingly connected to the member 20 intermediate of its ends to be disposed at one flat side of such member is a leg 25, and this connection is made by cutting and stamping from the member a hook-like tongue portion 23 which has a loose end connection with the leg member 25. The leg member is swingable on the portion 23 so that it will extend at right angles to the member 20 or will lie in close proximity to the member 20 in parallel relation thereto. The handle portion 38 of the member 20 has secured thereto by rivets 24 and 26 respectively, a plate member 27 forming a housing 28 in which is pivotally mounted by means of the rivet 26 the knife blade 39. Fixed to the outer side of the plate member 27 is a magnifying glass 40 and the body portion 38 rearwardly of the magnifying glass 40 is provided with a cut out portion 29 which permits the magnifying glass to be used when the member 20 is positioned on the line of writing for the magnifying of such writing. The knife blade 39 is swingable into and out of the housing 28 for use as desired by the user or is swung out of the housing when it is desired to use the magnifying glass.

In Figures 3 and 4 the knife edge 22 on the portion 21 is eliminated and is substituted by the saw tooth edge 49. The body portion 43 of the member 20' is provided at one end with a rivet 50 and pivotally secured to the portion 43 by the pivot 50 is the housing 41. The housing 41 is provided with a rivet 51 at the opposite end on which is swingably mounted a fingernail file 44 and a screwdriver 45 respectively. When the housing is folded into position on the body 43 the pivot 51 will enter the notch 46 in the body 43 to retain the housing 41 in latched relation to the body 43. Body 41 is divided into two sections, 42 and 42' respectively, and while one section carries the fingernail file 44, the other section carries the screwdriver 45, and carried within the respective sections 42 and 42' on the rivet 50 are the knife blades 48. It will also be noticed that the portion 43 also carries a magnifying glass 47 which will be used in the same manner as the magnifying glass 40 as disclosed in Figure 1.

The device or implement in its preferred or modified forms of construction can be used for many purposes which would be obvious and in repeating some of its uses a book binder and page holder, letter opener, paper weight, magnifying glass, line follower, rule, paper cutter, nail file, screwdriver, saw, etc. which should be a most popular usage for an implement of this type.

It is believed that the construction of the various elements of the invention will be understood by any one skilled in the art as well as the uses to which they may be adapted, and it is understood that any minor changes made in the construction of the invention are permissible provided such changes fall within the scope of the appended claims and the spirit of the invention.

Having thus described the invention what is claimed as new and is desired to be secured by Letters Patent is:

1. An implement of the kind described comprising a flat elongated body member having a tampering edge portion and a body portion, a sectional housing for cutting implements pivoted at one end to the outer end of said body member, so that the sections of said housing lie on opposite sides of said body portion, a notch in said body member inwardly of the outer end and a fastening means carried by the housing receivable in the notch to retain the housing in fixed relation to the body portion.

2. An implement of the kind described comprising a flat elongated member, having a tapering edge portion and a body portion, a saw tooth edge on said tapering portion, a housing pivotally connected to one end of said body portion, a plurality of cutting implements carried by said pivot, a second pivot at the opposite end of the housing, a plurality of cutting implements carried by said second pivot and a notch in said body portion coacting with said second pivot to retain said housing in parallel relation to said body portion.

FRANK W. BAUKUS.

REFERENCES CITED

The following references are of record in the file of this patent:

UNITED STATES PATENTS

| Number | Name | Date |
|---|---|---|
| 330,557 | Brown | Nov. 17, 1885 |
| 883,648 | Landers | Mar. 31, 1908 |
| 1,840,135 | Schutt | Jan. 5, 1932 |
| 2,276,026 | Davidson | Mar. 10, 1942 |
| 2,319,436 | Bailie | May 18, 1943 |